UNITED STATES PATENT OFFICE.

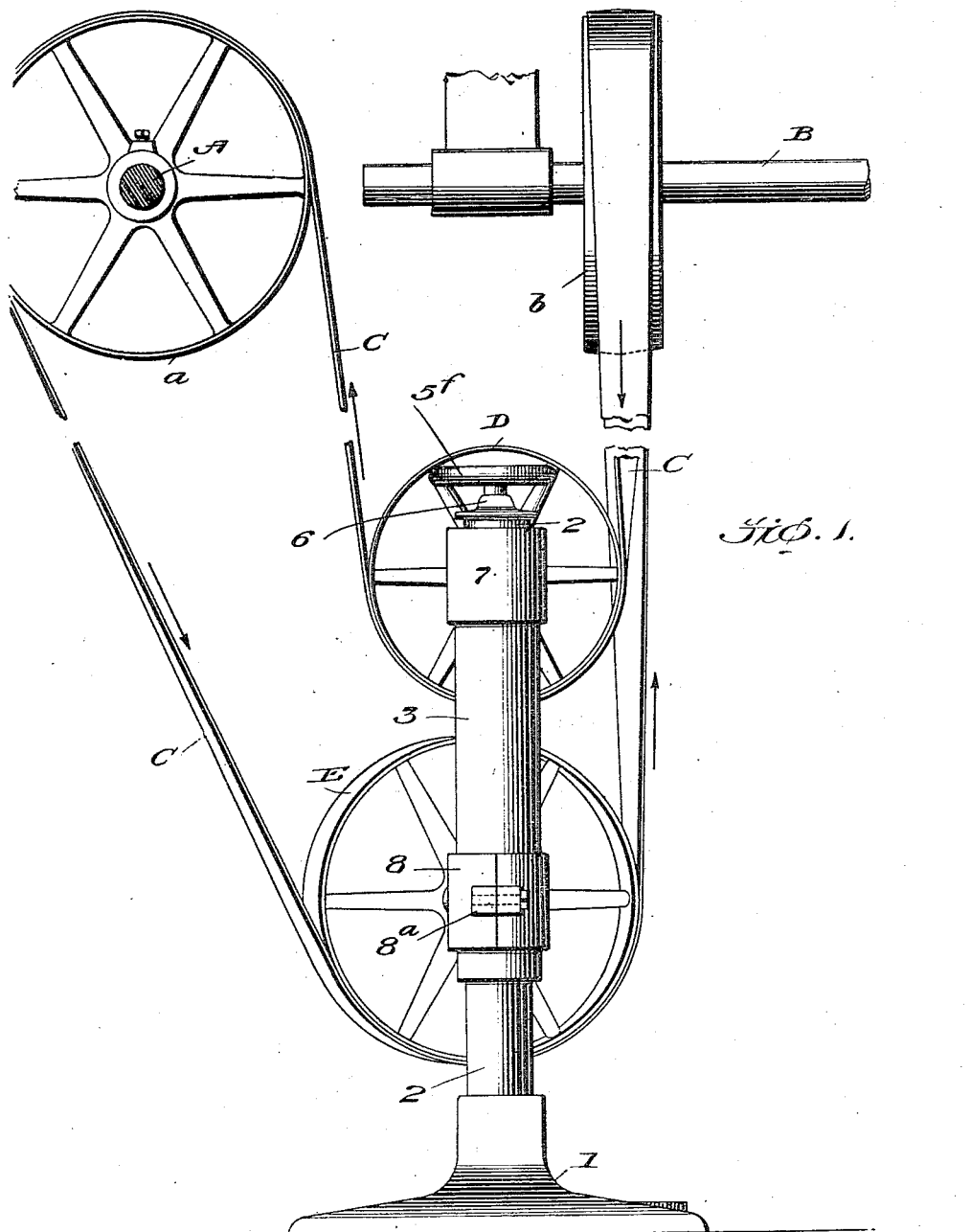

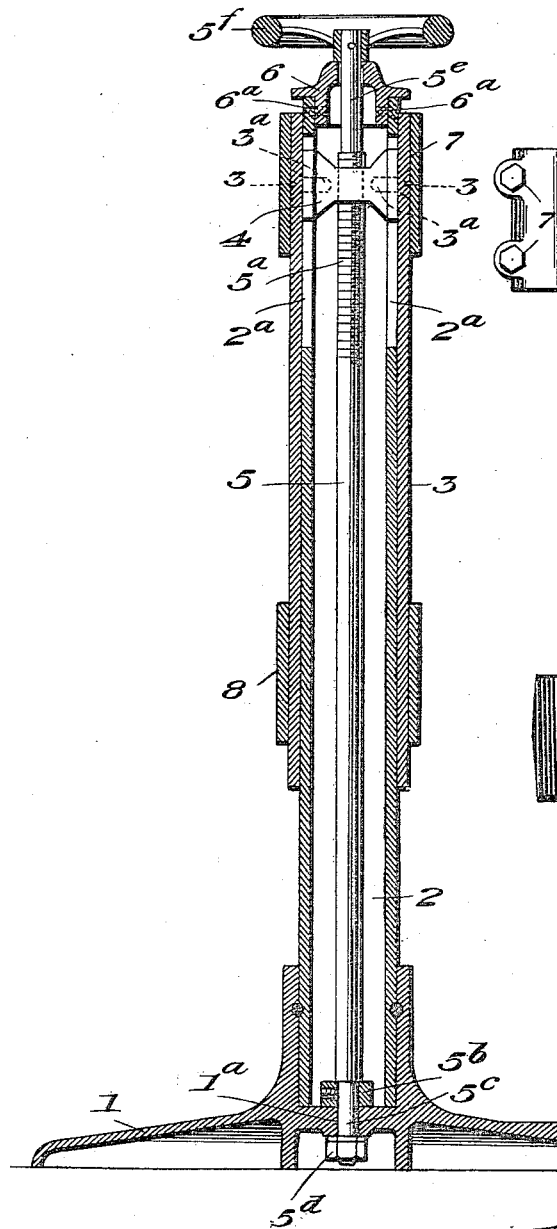
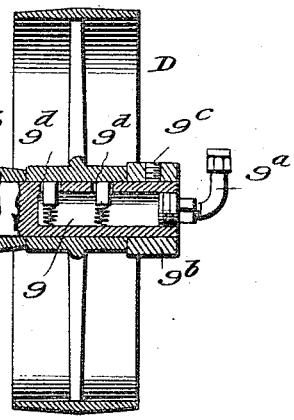
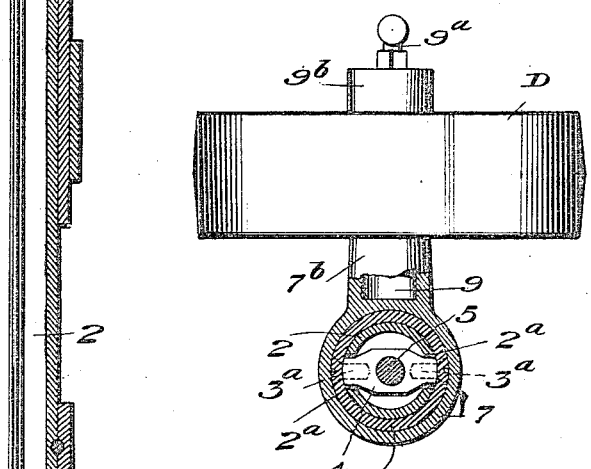

NICHOLAS BARRY, OF MUSCATINE, IOWA.

PULLEY-STAND.

1,244,943.

Specification of Letters Patent.

Patented Oct. 30, 1917.

Application filed March 10, 1917. Serial No. 153,991.

*To all whom it may concern:*

Be it known that I, NICHOLAS BARRY, a citizen of the United States, residing at Muscatine, in the county of Muscatine and State of Iowa, have invented certain new and useful Improvements in Pulley-Stands; and I hereby declare that the following is a full, clear, and exact description thereof, reference being had to the accompanying drawings, which form part of this specification.

This invention is a novel pulley stand for so called "corner belt" or "angular belt" drives, in which drives belts are used to transmit power from one shaft to another shaft running at an angle thereto; usually the belts passing from one shaft to the other are directed around what is commonly called a "mule" or "mule stand"; this has caused a great deal of trouble and annoyance.

The object of the present invention is to provide a novel pulley-stand which may be located intermediate the shafts and in almost any desired position, so that the bends of the belt engage its pulleys, and the pulleys are capable of adjustment to suit the direction of the bends of the belt and also to take up slack in the belt and always insure an efficient belt drive between the driving and driven shafts.

I will explain the invention as illustrated in the accompanying drawings which show one practical and the present preferred embodiment of the invention, and refer to the claims for summaries of the novel features and combinations of parts for which protection is desired.

In said drawings:

Figure 1 is a side view of my novel pulley-stand showing the preferred arrangement of the stand and the driving and driven shafts and pulleys and belt.

Fig. 2 is an enlarged vertical sectional view through the pulley-stand.

Fig. 3 is a horizontal section on the line 3—3 Fig. 2.

Fig. 4 is a detail sectional view through one of the pulleys and its support detached.

In the drawings A designates what I shall call the "driving" shaft, and B the "driven" shaft, provided with pulleys $a$ and $b$ respectively. These shafts are arranged at an angle to each other. A belt C runs from the pulley $b$ down under the idler pulley D, on my novel pulley-stand, up over the driving pulley $a$ down under a second idler pulley E, on the pulley-stand, and back to the pulley $b$. When arranged as shown in Fig. 1 the shaft B can be driven from the shaft A arranged at right angles thereto.

The novel pulley-stand shown in the drawings is constructed as follows: To a base 1, of any suitable construction, is attached a tubular standard 2. Slidably mounted on the upper portion of this standard is a sleeve 3, which is connected at its upper end to a cross head 4 arranged within the standard 2 but having its ends guided in vertical slots $2^a$ in said standard, see Figs. 2 and 3. The sleeve 3 is rigidly connected to the ends of the cross-head 4 by bolts or screws $3^a$, or other suitable means.

The cross-head 4 has an internally threaded opening which is engaged with a threaded portion $5^a$ of a shaft 5 rotatably mounted axially of and within the standard 2. This shaft 5 may have a bearing collar $5^b$ on its lower end, resting on the base 1. The lower end of shaft 5 may be reduced as shown at $5^c$ and extended through an axial opening $1^a$ in the base; and may be secured in the standard, while free to rotate therein, by means of a nut $5^d$ or other suitable retaining device engaging its lower end as shown.

Shaft 5 has a preferably reduced upper part $5^e$ that extends through and is journaled in a cap plate 6 mounted upon standard 2 and rigidly secured thereto by screws $6^a$ or other suitable means. On the upper end of shaft 5 above the cap is a hand wheel $5^f$ by which shaft 5 may be rotated. When the shaft 5 is turned it will, by the engagement of threaded portion $5^a$ with the yoke 4, raise or lower said yoke and correspondingly raise or lower the sleeve 3.

To this sleeve 3 are attached collars 7 and 8, which are preferably constructed alike, and split and secured to the sleeve by means of clamping bolts indicated at $7^a$ and $8^a$ respectively.

Preferably each collar 7 and 8 is provided with a radially projecting spindle upon which the pulleys D and E are respectively journaled. Preferably these spindles are formed separate from the collars and attached thereto.

As shown in Fig. 4, the spindle 9 has its inner end seated in a socket in a lateral tubular projection $7^b$ of the collar 7 and is secured thereto by a tap bolt $7^c$. Preferably the spindle 9 is hollow and provided on its outer end with an oil supply cup $9^a$, which may be of any suitable construction, to supply lubricant to the interior of the spindle.

The pulley D (or E) mounted upon such spindle may be retained thereon by means of a collar $9^b$ secured by a tap bolt $9^c$ or other suitable means. Lubricant may be fed from the interior of the spindle to the hub of the pulley D (or E) through apertures $9^d$ in the upper side of the spindle as indicated in Fig. 4, so that the pulley will be thoroughly lubricated.

In setting up the device the pulley-stand is preferably placed beneath the pulleys $a, b$ and the pulleys D and E are adjusted rotatably of the stand until they properly engage the bights of the belt. The pulleys D and E are primarily adjusted by shifting the collar 7, or 8, or both, so as to approximately properly tension the belt, then the collars 7 and 8 are made fast to the sleeve 3. Any desired tension can then be imparted to the belt C by turning hand wheel $5^f$ so as to adjust the sleeve 3 up or down. If the belt slackens the slack can be taken up and the proper tension maintained by turning the hand wheel $5^f$ so as to lower the sleeve 3 with the pulleys D and E.

My pulley-stand can be arranged in almost any direction or position desired, and the pulleys D, E, can be adjusted rotatably of the sleeve 3 and also longitudinally thereof to any desired positions. All the parts are easily accessible and interchangeable and can be readily repaired if injured.

The belt preferably hangs over the driven and driving pulleys and passes under the intermediate pulleys D and E, so that the slack of the belt will tend to hang below the pulleys D and E, and by adjusting sleeve 3 by means of the hand wheel $5^f$ any desired tension can be given the belt; and the slack can be quickly taken up and the belt tensioned as desired because both pulleys D and E are adjustable simultaneously in the stand shown. The hollow spindles supply ample lubricant to the bearings of pulleys D and E and keep them well oiled. This pulley-stand can be adjusted to suit the natural hang and run of the belt, relieves play and avoids unnecessary strains or stresses on the belt.

The construction shown is simple, practical and efficient, but I do not consider the invention restricted to the specific form and construction of elements thereof illustrated in the drawings.

What I claim is:

1. In a pulley-stand the combination of a standard, a member slidable thereon, pulley supports connected with said member and adapted to be rotatably adjusted in relation thereto, means for adjusting the pulley supports on the member, and means operable during the operation of the pulleys for adjusting the member on the standard.

2. A pulley support comprising a standard, a sleeve slidably mounted on the standard, means for adjusting the sleeve on the standard, and a pulley support connected with said sleeve and adjustable both rotatorially and longitudinally thereon.

3. A pulley-stand comprising a standard, a sleeve telescoping the standard, a cross head within the sleeve and standard and engaging said sleeve, a threaded shaft engaging the cross head, means for rotating said shaft to adjust the cross head and sleeve, and a pulley support connected with said sleeve.

4. A pulley-stand comprising a standard, a sleeve telescoping the standard, a cross head within the sleeve and standard and engaging said sleeve, a threaded shaft engaging the cross head, means for rotating said shaft to adjust the cross head and sleeve, and pulley supports adjustably connected with said sleeve.

5. A pulley-stand comprising a tubular standard, a sleeve telescoping the standard, a cross head within the standard and sleeve and engaging said sleeve, a threaded shaft engaging the cross head, and means for rotating said shaft to adjust the cross head and sleeve, pulley supports connected to and simultaneously adjustable with the sleeve, and pulleys on said supports.

6. A pulley-stand comprising a tubular standard, a sleeve telescoping the standard, a cross-head within the standard and sleeve and engaging said sleeve, a threaded shaft engaging the cross head, means for rotating said shaft to adjust the cross head and sleeve, and independently adjustable pulley supports connected with said sleeve and simultaneously adjustable with the sleeve.

7. A pulley-stand comprising a base, a tubular standard attached thereto, a sleeve fitted on the standard, a rotatably threaded shaft in the standard, a cross head in the standard having a threaded engagement with said shaft and operatively connected with the sleeve through openings in the standard, means for rotating the shaft and a pulley support connected with said sleeve.

8. A pulley-stand comprising a base, a tubular standard attached thereto, a sleeve fitted on the standard, a rotatably threaded shaft in the standard, a cross head in the standard having a threaded engagement with said shaft and operatively connected with the sleeve through slots in the standard, means for rotating the shaft, a collar adjustably attached to said sleeve, a spindle attached to said collar, and a pulley on said spindle.

9. A pulley-stand comprising a base, a tubular standard attached thereto, a sleeve fitted on the standard, a rotatably threaded shaft in the standard, a cross head in the standard having a threaded engagement with said shaft and operatively connected with the sleeve through slots in the standard, means on the outer end of the shaft for rotating the same, collars attached to said sleeve and independently adjustable thereon, spindles attached to said collars, and pulleys on said spindles.

In testimony that I claim the foregoing as my own, I affix my signature.

NICHOLAS BARRY.

Copies of this patent may be obtained for five cents each, by addressing the "Commissioner of Patents, Washington, D. C."